United States Patent

Fritschi

[15] 3,700,822

[45] Oct. 24, 1972

[54] ARRANGEMENT FOR REDUCING GLARE ON TWO-WAY TRUNKS

[72] Inventor: Walter William Fritschi, Denver, Colo.

[73] Assignee: Bell Telephone Laboratories, Incorporated, Berkeley Heights, N.J.

[22] Filed: April 30, 1971

[21] Appl. No.: 139,011

[52] U.S. Cl. ..............................................179/18 AH

[51] Int. Cl. ..............................................H04m 7/00

[58] Field of Search ..............................179/18 AH

[56] References Cited

UNITED STATES PATENTS

| | | | |
|---|---|---|---|
| 2,897,280 | 7/1959 | Lomax | 179/18 EA |
| 3,491,213 | 1/1970 | Gilboy et al. | 179/18 AH |

*Primary Examiner*—Thomas W. Brown

*Attorney*—R. J. Guenther and James Warren Falk

[57] ABSTRACT

An arrangement is disclosed for minimizing the possibility that two-way interoffice trunks will be seized at both ends, simultaneously, for calls originating at each office. Each time a predetermined number of trunks are seized at either office a busy condition is imposed at the opposite end of at least two other trunks. These trunks become, in effect, temporary one-way trunks.

13 Claims, 5 Drawing Figures

INVENTOR
W. W. FRITSCHI
BY Charles H. Davis
ATTORNEY

PATENTED OCT 24 1972

3,700,822

ARRANGEMENT FOR REDUCING GLARE ON TWO-WAY TRUNKS

BACKGROUND OF THE INVENTION

This invention relates to communication systems and particularly to arrangements for selecting trunks for communication between switching offices. In a more particular aspect, this invention is concerned with reducing the probability that two-way interoffice trunks will be simultaneously seized at both ends. In a still more particular aspect, this invention relates to arrangements for reducing blocking in a switching system.

Communication networks generally comprise a plurality of switching offices interconnected by trunks which are used for communication between customers served by different offices. Depending upon the amount and direction of traffic between two offices, the trunks that are provided may be one-way trunks, which are capable of serving only calls originating at one of the offices, or the trunks may be two-way trunks which are capable of completing calls originating at either of the two offices to which the trunks are connected. Under certain conditions wherein the amount and direction of traffic between two offices is unpredictable, one-way trunks may be inefficient. The tendency therefore, is to provide two-way trunk groups which can be used for calls in either direction between the offices depending upon where the traffic originates.

While two-way trunk groups offer some advantages, it is well know that two-way trunks are subject to certain problems. For example, when a two-way trunk is seized at one end to complete a call originating at one office, a signal is sent to the distant end office to make the trunk busy so that the trunk cannot be seized at the distant office for calls originating thereat. During peak busy hours when trunks are in great demand it sometimes happens that a trunk is seized at the distant end office before the trunk circuit thereat has been made busy by the signal transmitted from the near end office. Each office, therefore, is connected to the same trunk waiting to forward its call to the other office. The offices remain in this condition with neither call being completed until corrective action is taken. The corrective action might cause each office to release and return a recorder signal to its calling customer or make a second attempt to complete the call. If both offices make a second attempt and no other trunks are available the offices may resize the same trunk resulting once again in a mutual lock-out condition. This mutual lockout condition wherein a two-way trunk is seized simultaneously at both ends has been referred to and will be referred to herein as a "glare" condition.

Several prior art arrangements have dealt with the problem of glare conditions in two-way trunk groups. For example, in one known arrangement the individual trunks are permanently arranged to serve only one of the calls in the event that the trunk is simultaneously seized for calls originating at both offices. With this arrangement, a call at one of the offices is permitted to complete over the two-way trunk while another attempt must be made to complete the call that is forced to release at the other office. It will be realized that this arrangement, while wholly suited for its intended purpose, requires many second attempts to complete calls thereby prolonging the holding time of the common equipment at the switching centers.

Other arrangements are known whereby the individual trunks are directionalized, that is, the trunks are temporarily made busy at one office and can only be used as one-way trunks in anticipation of serving only the traffic which originates at the other office. The arrangements for temporarily busying the trunk circuits at the different offices are often controlled by circuits which are programmed as a result of prior traffic studies to make a few trunks busy in each direction during certain hours of the day and to alter the number of trunks that are directionalized to meet the anticipated traffic demand. It is obvious, of course, that the effectiveness of these arrangements depends on how accurately the traffic which is realized compares with the anticipated traffic. If, for example, a large group of two-way trunks are made busy at one office in anticipation of a great amount of traffic from the other office when in fact the trunks are needed due to an unpredicted amount of traffic originating at the first office, then the entire arrangement tends to make the trunk scheme less efficient and service is degraded.

SUMMARY OF THE INVENTION

While the aforementioned prior art arrangements for selecting trunks are wholly suitable for their intended purposes they lack certain novel features which have been incorporated in the present invention. In accordance with one illustrative embodiment of the invention, a group of two-way trunks is provided between two switching offices. To minimize glare conditions the switching offices can be arranged to select trunks from the same trunk group in different preferred orders. Furthermore, the trunks are arranged so that each time certain trunks are seized for a call, the seized trunks will impose an artificial busy condition at the opposite end of at least two additional trunks whether or not these trunks have been seized for service. The trunks with the imposed busy condition temporarily become, in effect, one-way trunks and are reserved for calls in opposite directions. Thus, a buffer of temporarily directionalized one-way trunks moves ahead of the trunks seized by each office and the number of trunks reserved by an office depends on the amount of traffic originating at the office.

For example, let it be assumed that a two-way trunk group is employed for handling the telephone traffic in both directions between two switching offices which have been arbitrarily designated EAST and WEST. To minimize the possibility of a glare condition, the WEST office can be arranged to select idle trunks by hunting over the trunk group in a different sequence than the EAST office. Under these circumstances, glare conditions are minimized until both offices begin hunting over the same portion of the trunk group. To further minimize the possibility of a glare condition, when trunk O is seized at the WEST office, in addition to making itself busy at both offices, trunk O makes two additional trunks busy at their opposite ends. More specifically, trunk O makes trunk 1 busy at the WEST office and trunk 2 busy at the EAST office. On its next selection the WEST office skips trunk 1 and is guaranteed access to trunk 2 by virtue of trunk 2 having been made busy at the EAST office when trunk O was seized. If trunk 2 is seized at the WEST office and trunk 1 is still busy, trunk 3 is made busy at the WEST office and is reserved for calls from the EAST office. The seizure of trunk 2 also makes trunk 4 busy at the EAST office, thereby reserving trunk 4 for selection at the WEST office. At this point trunks 1 and 3 have imposed busy conditions on them at the WEST office and these trunks are reserved for traffic originating at the EAST office. The same procedure takes place when trunks are selected at the EAST office, only the EAST office would impose busy conditions on trunks in a different portion of the trunk group. Thus, a buffer of temporarily directionalized trunks moves ahead of the blocks of trunks seized by each office and the number of trunks directionalized is dynamically changed in accordance with the traffic in each direction.

In accordance with another feature of the invention, the imposed busy condition can be folded back at some appropriate point, such as the midpoint, of the trunk group to permit one office with a greater service demand to monopolize the second half of the trunk group as long as its demand exceeds the first half of the trunk group.

DESCRIPTION OF THE DRAWING

These and other features of the arrangement contemplated will be better understood by the following description made with reference to the drawing in which.

DETAILED DESCRIPTION

Figure 1:
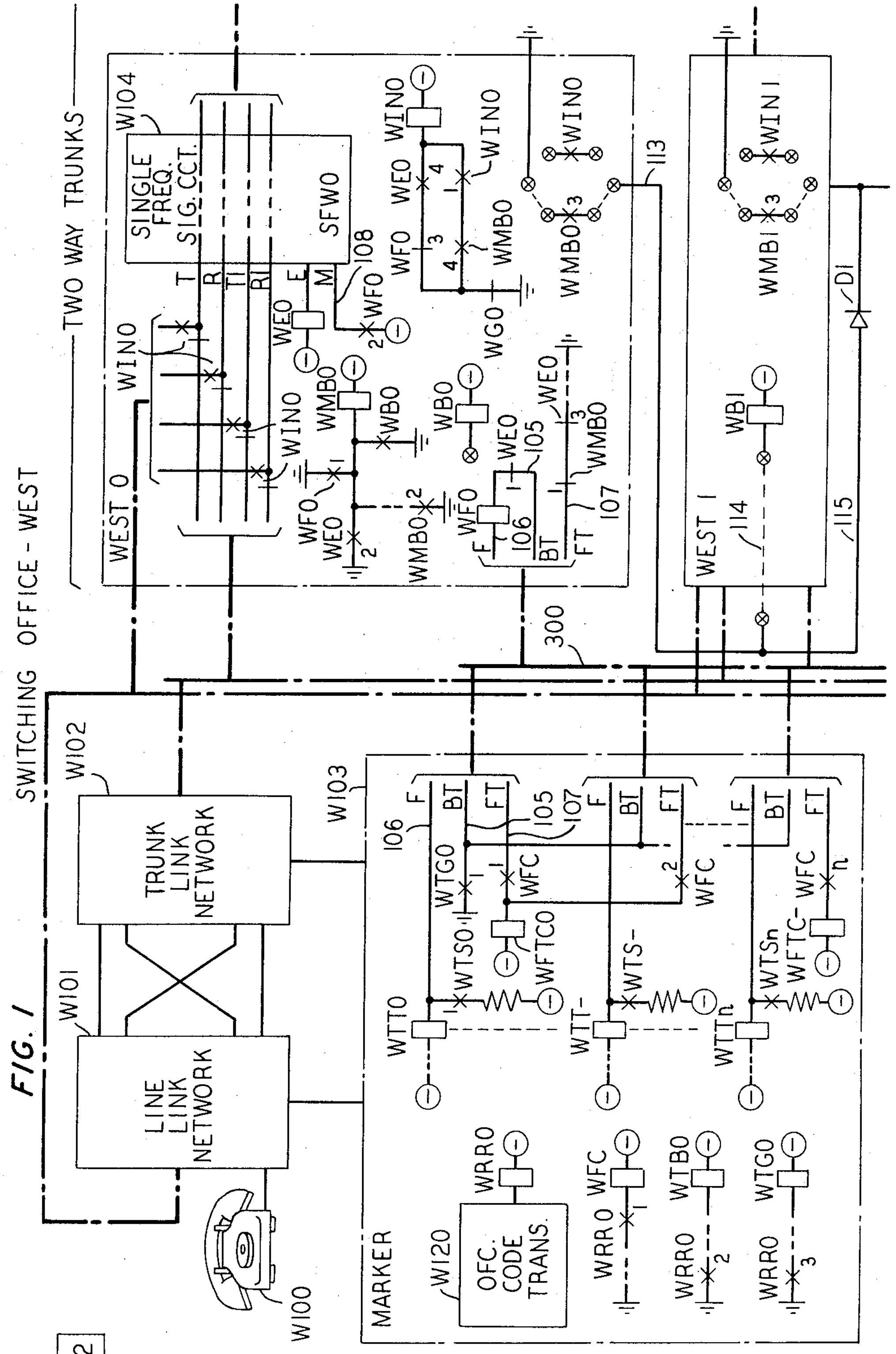
FIGS. 1 and 2 each show a portion of two telephone switching offices interconnected by two-way trunks.
Figure 5:
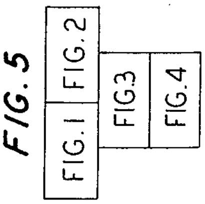
FIG. 5 shows the arrangement of FIGS. 1 through 4.
Figure 2:
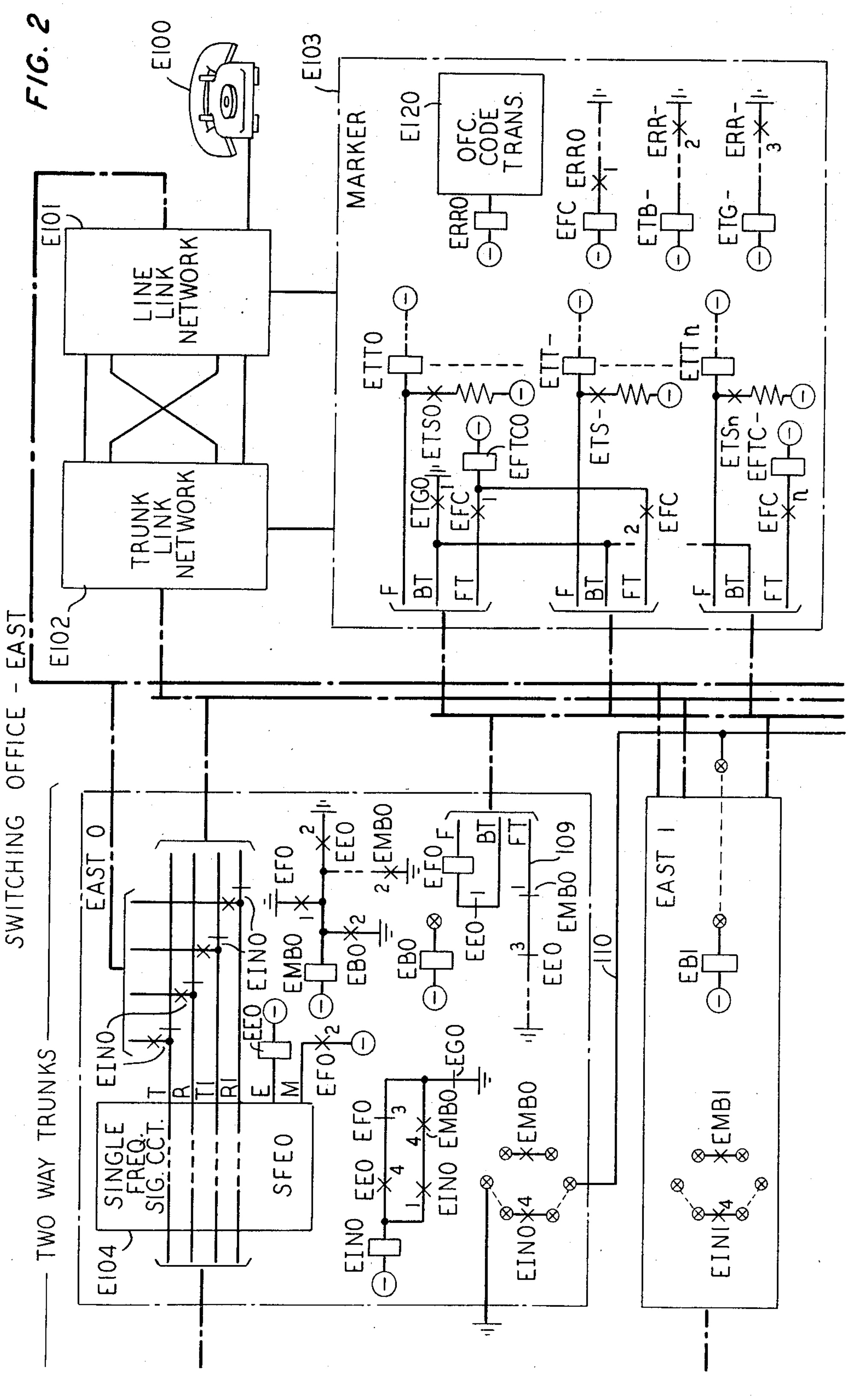
Figure 3:
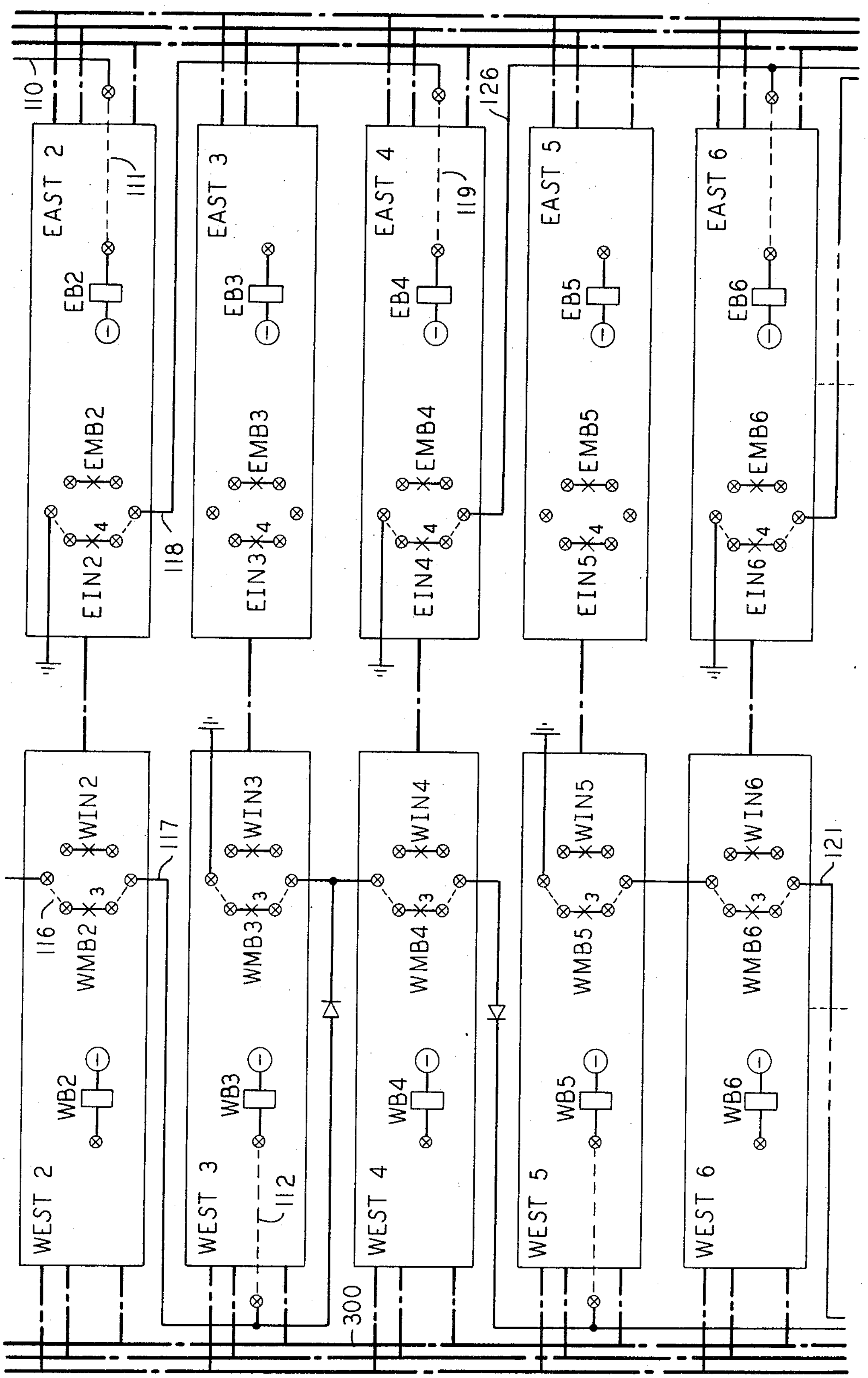
FIGS. 3 and 4 show a portion of a plurality of two-way trunks and the manner in which the trunks are interconnected in accordance with the invention.
Figure 4:
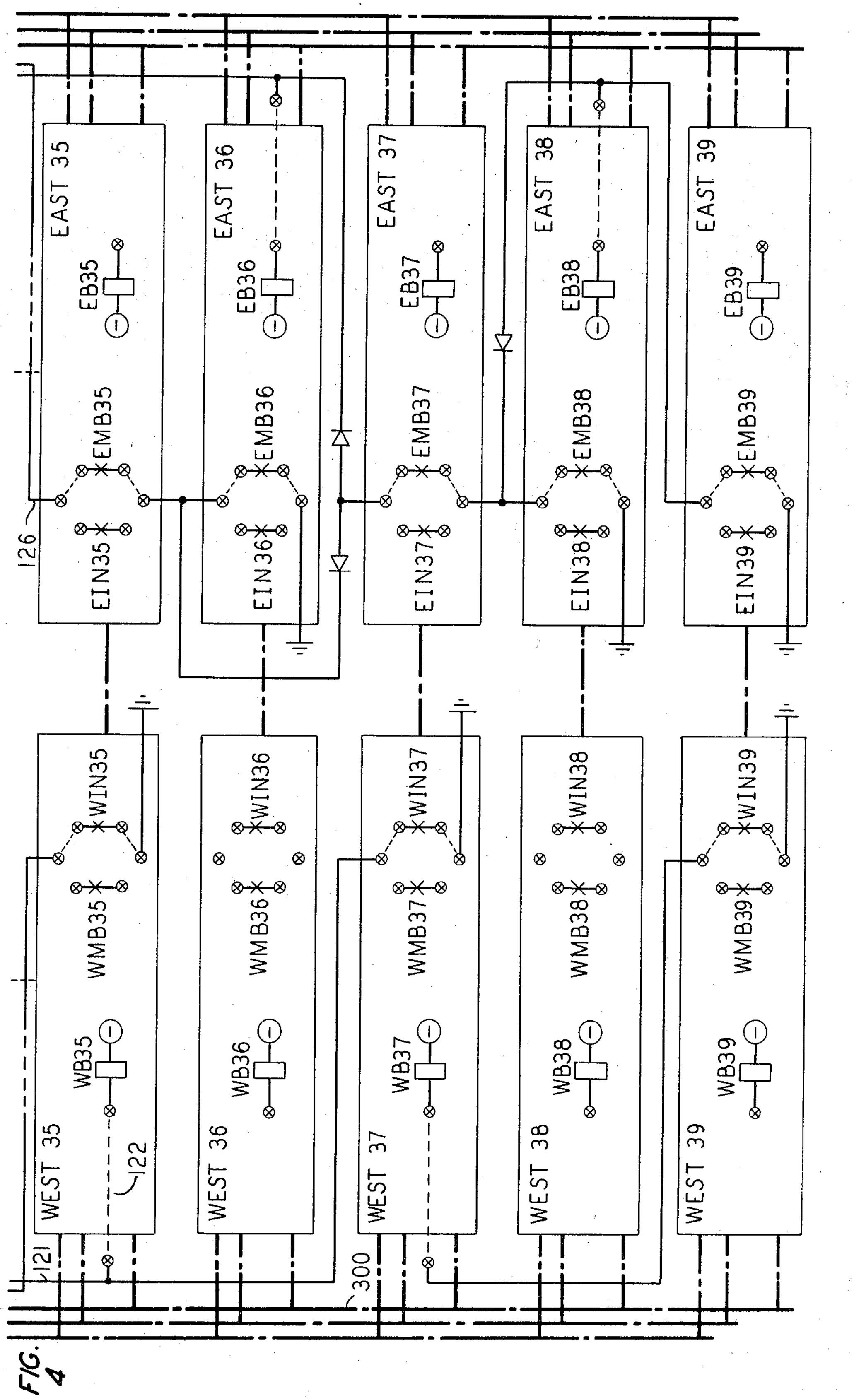

FIG. 1 shows a portion of a telephone switching office designated WEST, FIG. 2 shows a portion of a similar office designated EAST and to simplify the disclosure it will be assumed that these offices are identical. The switching offices shown in the drawing are assumed to be of the type set forth in more detail in U.S. Pat. No. 2,585,904 to A. J. Busch of Feb. 19, 1952. It will be obvious, of course, that the invention can be employed in many other types of switching offices.

Switching office WEST comprises a line link network W101, a trunk link network W102 and common control equipment including a plurality of marker circuits, such as marker W103. Subscriber stations, such as W100 are connected to the line link frames in the line link network while trunks and originating registers are terminated on trunk link frames in the trunk link network. Two-way trunks are terminated on both line and trunk link frames for completing incoming calls to local stations and to facilitate trunk-to-trunk connections when the switching office is used as a tandem office. Markers, such as W103 control the establishment of connections over the line and trunk link networks and in addition, marker W103 tests and selects idle trunks for forwarding calls to distant switching offices, such as switching office EAST.

Interconnecting switching office WEST with switching office EAST is a group of two-way trunks numbered 0–39. Each trunk comprises a trunk circuit at each switching office and the trunk circuits are interconnected over suitable transmission facilities. To simplify the disclosure, it will be assumed that the trunk circuits at both offices are identical. Supervisory signals are transmitted between offices using the well-known E&M type signaling. With this signaling arrangement, each trunk circuit is equipped with a single frequency signaling circuit, such as W104 at switching office WEST, for transmitting tone signals within the voice frequency band to the other switching office. More specifically, in trunk circuit WEST 0, single frequency signaling circuit W104 responds to direct-current signals on conductor M to change the tone being sent to the single frequency signaling circuit E104 at the distant office. In a similar manner, a change of tone received by single frequency signaling circuit W104 from switching office EAST causes direct current signals to be transmitted over conductor E to actuate relay WEO in trunk circuit WEST 0. Of course it will be obvious from the ensuing description that many other types of signaling can be used without departing from the spirit and scope of the invention.

In accordance with a feature of the invention each trunk circuit can be made busy under different circumstances. For example, a trunk circuit at one office may be made busy when the common control seizes the trunk for a call originating at that office. Also the trunk circuit at one office may be made busy when the trunk is seized at its distant end for a call incoming to that office. Furthermore, the trunk circuit may be made busy by virtue of other trunks being seized for a call. This last condition, that is when a trunk circuit is made busy by another trunk circuit, will be referred to as an "imposed" busy condition.

To illustrate the operation of the arrangement a description will now be given of the manner in which the trunks are selected. When a customer, such as W100 initiates a call, a connection is established between the customer station and an originating register circuit (not shown) which returns dial tone. The customer dials the telephone number of the called station and this number is recorded in the originating register circuit. After the called number is recorded, the originating register connects to a marker such as marker W103 and forwards the called number to the marker. In the marker, the called number is translated into information for selecting a trunk. More specifically, the digits which identify the destination office are translated through an office code translater W120 to operate a route relay, such as WRRO. The route relay, in turn, operates a frame connector relay, such as WFC, which closes its contacts WFC-1, WFC-2, etc., to extend a plurality of conductors designated FT from all trunk circuits in a route to the marker. All trunks in the same route and located on the same trunk link frame have their FT leads connected to the same WFTC-relay and when one of these trunks is idle a ground is extended over its FT lead to operate the appropriate WFTC-relay indicating that a particular trunk link frame has at least one idle trunk.

In addition, the marker uses circuitry (not shown) to determine which trunk link frames are busy on other calls. If a trunk link frame is idle and there is at least one idle trunk in the appropriate route located on that frame, then the marker goes through a sequence of operations in order to seize the trunk link frame and extend test and control leads from the marker to the trunk link frame in preparation for seizing an idle trunk.

The trunks in each frame are divided into trunk block groups containing a maximum of 20 trunks in each group. The trunk block group and the location of the trunk within the group are determined by the route relay. When the route relay operated it also operated a tens block relay WTBO and a trunk group relay WTGO. With these relays operated a plurality of test paths is extended between the individual trunks and the marker. One such path can be traced from ground on contacts WTGO-1 in FIG. 1, over conductor 105 in cable 300 to trunk circuit WEST 0, through contacts WEO-1, through the winding of relay WFO and back over conductor 106 in cable 300, through the winding of relay WTTO and equipment in the marker (not shown) to battery. WTTO operates indicating that trunk circuit WEST 0 is idle but due to the high resistance of the winding of relay WTTO, relay WFO in the trunk circuit is prevented from operating at this time. Relays in the marker similar to relay WTTO but associated with other idle trunks are also operated indicating to the marker that these other trunks are idle.

In the marker there is a sequence circuit which causes the marker to choose a particular unit of equipment such as a trunk from all the available units. The sequence circuit comprises a plurality of WTS- relays which are arranged in a chain so that a different relay operates on each marker usage. Thus, if a marker fails on its first attempt to complete a call using one trunk, the sequence circuit will advance and cause the marker to choose a different trunk. Since several markers may be provided in an office and each marker selects trunks from many trunk routes, the trunks in any one route may not be selected in a fixed order. The trunks in any one route may in fact appear to be selected in a random fashion.

To assist in understanding the present invention, it will be helpful to consider that the trunks are selected in a particular sequence. Let it be assumed that switching office WEST selects trunks in an ascending order beginning with trunk 0 and that switching office EAST selects trunks in a descending order beginning with trunk 39. It will also be assumed that all trunks are initially in an idle state.

Assuming that sequence relay WTSO in marker W103 is operated, a low resistance battery is connected over conductor 106 to relay WFO in trunk circuit WEST 0 to operate relay WFO. Relay WFO, in operating, operates relay WMBO and relay WMBO is locked operated through trunk circuitry (not shown) to ground at its own contacts WMBO-2.

When relay WMBO operates it opens its contacts WMBO-1 to remove the ground from conductor 107 thereby indicating to the marker that trunk 0 is no longer idle.

Relay WFO, in operating, also closes its contact WFO-2 to connect battery over M lead 108 to single frequency signaling circuit W104. When battery is connected to M lead 108, single frequency signaling circuit W104 sends a seizure signal to the distant end switching office. At the distant end switching office the seizure signal is detected by single frequency signaling circuit E104 which operates relay EEO. When relay EEO operates in trunk circuit EAST 0, it begins a series of events which causes an incoming register (not shown) to be connected to the trunk to receive the called number as it is forwarded from a sender at switching office WEST. Relay EEO also its contacts EEO-3 to remove the trunk idle indication from FT lead 109 and opens its contacts EEO-1 to prevent trunk circuit EAST 0 from being seized through the operation of relay EFO. Relay EEO also closes its contacts EEO-2 to operate make busy relay EMBO which locks through trunk circuitry (not shown) to ground at contacts EMBO-2. While relay EEO made trunk circuit EAST O busy initially, relay EMBO will now maintain the trunk busy condition because relay EEO will be used subsequently to convey other supervisory signals from switching office WEST to switching office EAST.

Relay EEO also closes its contacts EEO-4 to complete a circuit for operating relay EINO. Relay EINO places trunk circuit EAST 0 in its incoming mode by transferring the transmission conductors from the trunk link frame appearance to the line link frame appearance. Relay EINO also closes its contacts EINO-4 to extend ground over conductor 110 and cross connection 111 to operate relay EB2 in trunk circuit EAST 2. It has been assumed that trunk circuit EAST 2 is identical to trunk circuit EAST 0 and when relay EB2 operates it completes path in trunk circuit EAST 2 for operating relay EMB2 (not shown) which is similar to relay EMBO in trunk circuit EAST 0. The operating circuits for relays EMB- have not been shown in all of the trunk circuits but it will be realized that each of these operating paths is similar to the circuitry shown for relay EMBO in trunk circuit EAST 0. When relay EMB2 operates, it imposes a busy condition on trunk circuit EAST 2. Since it has been assumed that trunk 2 had not been taken for service, trunk circuit WEST 2 will still test idle. Thus, the imposed busy condition on trunk circuit EAST 2 directionalizes trunk 2 so that trunk 2 can only be seized for service by the WEST switching office.

In a similar manner the seizure of trunk circuit WEST 0 will impose a busy condition on trunk circuit WEST 1. More specifically, when relay WMBO operated it closed its contacts WMBO-3 to extend ground over conductor 113 and cross connection 114 to operate a relay WB1 in trunk circuit WEST 1. Relay WB1, in operating, completes a circuit for operating relay WMB1 (not shown) in trunk circuit WEST 1. The WMB- relays in the WEST trunk circuits are similar to the EMB- relays in the EAST trunk circuits and as mentioned above, these relays have not been shown in all of the trunk circuits to simplify the disclosure. It will be realized, however, that relay WMB1 in trunk circuit WEST 1 performs similar functions to the relay WMBO in trunk circuit WEST 0.

To recapitulate at this point, trunk 0 has been seized for a call originating at switching office WEST. This resulted in trunk circuits WEST 0 and EAST 0 being made busy and a busy condition being imposed on trunk 1 at the WEST office and on trunk 2 at the EAST office. The imposed busy condition on trunk circuit WEST 1 temporarily directionalizes trunk 1 so that it can only be seized from the EAST switching office. Similarly, the imposed busy condition on trunk circuit EAST 2 temporarily directionalizes trunk 2 so that it can only be seized at the WEST switching office. On its next attempt to extend a call to switching office EAST, marker W103 at switching office WEST can seize trunk 2. Assuming that trunk 2 is not busy serving another call, trunk 2 will be seized and trunk circuits WEST 2 and EAST 2 will be made busy. When trunk circuit WEST 2 is made busy, relay WMB2 operates to extend the ground from conductor 113, over conductor 115, through diode D1 and over cross connection 116, through contacts WMB2-3, over conductor 117 and cross connection 112 and through the winding of relay WB3 to battery thereby operating relay WB3. Relay WB3 imposes a busy condition on the trunk circuit WEST 3 thereby temporarily directionalizing trunk 3 to favor calls from switching office EAST.

When trunk circuit 2 was seized at switching office WEST, a seizure signal was transmitted over the trunk to switching office EAST to operate relay EIN2 (not shown) in trunk circuit EAST 2. The seizure signal makes trunk circuit EAST 2 busy and also extends ground over conductor 118 and cross connection 119 to operate relay EB4 in trunk circuit EAST 4. Relay EB4 imposes a busy condition on trunk circuit EAST 4, thereby directionalizing trunk 4 so that this trunk can only be seized at switching office WEST.

As can be seen from the above description, whenever both trunk circuits WEST 1 and WEST 2 are busy, a busy condition is imposed on trunk circuit WEST 3 and trunk 3 is reserved for calls originating at switching office EAST. In a similar manner, when trunk circuits WEST 3 and WEST 4 are busy, a busy condition is imposed on trunk circuit WEST 5 and trunk 5 is reserved for calls originating at switching office EAST. Thus, as far as switching office WEST is concerned for the first portion of the trunk group, whenever two trunk circuits are simultaneously busy, a busy condition is imposed on a third trunk circuit reserving this trunk for a call from switching office EAST.

Looking at the same portion of the trunk group, that is, the lowered numbered trunks at switching office EAST, it can be seen that as each even numbered trunk is seized for a call originating at switching office WEST, another even numbered trunk circuit is made busy at switching office EAST thereby reserving these other trunk circuits for calls which originate at switching office WEST. For example, when trunk circuit EAST 0 is seized for an incoming call it imposes a busy condition on trunk circuit EAST 2, when trunk circuit EAST 2 is seized for an incoming call it imposes a busy condition on trunk circuit EAST 4, etc.

It should be noted in the disclosed embodiment that at the office where a call originates, a relay designated MB- is used to impose a busy condition on another trunk circuit while at the office where the call terminates a relay designated IN- is used. The designation of these relays is not important, however, since different relays may be used depending on their availability in a particular trunk circuit. It is essential that a distinction be made between the action taken when a trunk circuit is seized for an originating call and when the trunk is seized for a terminating call.

The arrangement described above wherein the imposed busy condition moves ahead of the selected trunks can be used for the entire trunk group or for only part of the trunk group depending on the needs of the system. In the example disclosed, the imposed make-busy condition moves ahead of the seized trunks for only a portion of the trunk group after which the imposed busy condition is "folded-back" The term "-folded-back" as used herein for switching office WEST describes the condition wherein the imposed busy condition does not move ahead of the seized trunks but is actually imposed on the trunks in the first half of the trunk group that may still be busy.

More specifically, let it be assumed that the fold back occurs somewhere near the midpoint of the trunk group as shown in the drawing between trunks 6 and 35. If trunk circuits WEST 5 and WEST 6 are simultaneously made busy they impose a busy condition on a higher odd numbered trunk (not shown). For purposes of this discussion, however, it will be assumed that the busy condition is imposed on trunk circuit WEST 35. The circuit for imposing this busy condition on trunk circuit WEST 35 includes ground through contacts WMB5-3, WMB6-3, conductor 121, cross connection 122 and the winding of relay WB35 to battery. In operating, relay WB35 does not impose a busy condition on any higher numbered trunk circuits at switching office WEST, in fact, none of the trunk circuits above WEST 35 will impose a busy condition on a higher numbered trunk at switching office WEST. However, if trunk 35 is seized for a call originating at either switching office, trunk 35 may impose a busy condition on a lower numbered trunk depending on what other trunks are busy. More specifically, assume that trunk 35 has been seized for a call originating at switching office WEST. Relays WB35 and EB35 will be operated and relay EB35 will operate relay EMB35 (not shown) to make trunk circuit EAST 35 busy. If trunk circuit EAST 36 is also busy, ground will be transmitted over conductor 126 to impose a busy condition on a lower numbered trunk which has not been shown. For purposes of discussion, it will be assumed that the busy condition is imposed on trunk circuit EAST 6.

Since the trunk circuits above a certain number at switching office WEST do not impose busy condition on higher numbered trunks these higher numbered trunks are not reserved for calls originating at switching office WEST. With the trunk group arranged so that the imposed busy condition only moves ahead of the trunks selected in the first half of the trunk group, switching office WEST will never monopolize the first half of the trunk group since each time a certain pair of trunks are busy in that half of the trunk group, at least two other trunks are directionalized, that is, reserved for calls originating at one of the offices. On the other hand, as far as switching office WEST is concerned since the imposed busy condition is not utilized in the second half of the trunk group, switching office WEST can monopolize this portion of the trunk group if it has sufficient traffic demand. The fold-back condition which permits an office to monopolize one portion of the trunk group under heavy traffic conditions can occur at any point in the trunk group or be omitted altogether for either or both offices.

Trunk selection for switching office EAST is accomplished in the same manner as trunk selection in switching office WEST. However, the trunk group has been arranged so that when switching office EAST seizes the higher numbered trunks it imposes busy conditions on lower numbered trunks for a different portion of the trunk group than switching office WEST. For example, when trunk 39 is seized at switching office EAST it imposes a busy condition a trunk circuit EAST 38 and WEST 37. Similarly, when trunk 37 is seized at switching office EAST, trunk circuit EAST 36 and WEST 35 are made busy. It has also been assumed that the imposed busy condition is also folded back for switching office EAST. Thus, if switching office EAST has sufficient service demand it can dominate the lower numbered trunks but not monopolize the higher numbered ones.

It can be seen from the above description that glare conditions are minimized by the dynamic directionalization of certain two-way trunks each time a predetermined number of other two-way trunks are seized for service. The directionalized trunks become in effect one-way trunks and the number of trunks that are temporarily directionalized is dependent upon the amount of traffic originating in each office. Thus, it can be said that a buffer of trunks reserved for each office moves ahead of the trunks as the trunks are seized for service. If the service at one of the offices warrants it, that office can monopolize a portion of the trunk group giving the other office priority access to the remainder of the trunk group.

It is to be understood that the above-described arrangements are merely illustrative of the application of the principles of the invention. Numerous other arrangements may be devised by those skilled in the art without departing from the spirit and scope of the invention.

For example, different quantities of trunks may be directionalized based on different quantities of trunks being seized. Also the point of fold back as described above can be changed for either or both offices or eliminated altogether. Furthermore, the busy condition might be imposed on trunks in an alternate route based on the selection of trunks in a primary route.

What is claimed is:

1. In a communication system, a first and a second switching office, a plurality of two-way trunks interconnecting said offices, control means at each said office for seizing idle ones of said trunks for calls outgoing from said offices, and an arrangement for blocking the simultaneous seizure of idle ones of said trunks by the control means at both offices comprising circuit means effective upon the successive seizures of predetermined numbers of first ones of said trunks for busying at one of said offices a distinct number of other ones of said trunks, wherein the distinct number of other trunks busied varies with the number of first trunks seized.

2. The invention defined in claim 1 wherein said circuit means comprises means for directionalizing at least two of said other trunks.

3. The invention defined in claim 1 wherein each said two-way trunk comprises an individual trunk circuit associated with each said office and transmission means interconnecting said trunk circuits, and wherein said circuit means comprises first means in each said trunk circuit for detecting when said trunk circuit has been seized for a call outgoing from the office associated therewith, second means in each said trunk circuit for detecting when said trunk circuit has been seized for a call incoming to the office associated therewith, and means responsive to said first or said second detecting means for blocking the seizure of said trunk circuit by said control means.

4. The invention defined in claim 3 wherein said circuit means comprises means for actuating the blocking means of one of said first office trunk circuits under control of the blocking means of another of said first office trunk circuits and means for actuating the blocking means of one of said second office trunk circuits under control of the second detecting means of another of said second office trunk circuits.

5. In a communication system, a first and a second switching office, a plurality of two-way trunks interconnecting said offices, control means at each said office for testing the busy condition of said trunks for calls outgoing from said offices, and an arrangement for blocking the simultaneous seizure of idle ones of said trunks by the control means at both said offices comprising circuit means effective upon each seizure of a predetermined number of said trunks for imposing a busy condition at the opposite ends of at least two other ones of said trunks.

6. The invention defined in claim 5 wherein said predetermined number is one.

7. The invention defined in claim 5 wherein said predetermined number is at least two.

8. The invention defined in claim 5 wherein each said trunk comprises relay means associated with each said office for blocking the seizure of said trunk by said associated office control means, and wherein said circuit means comprises first means responsive to the seizure of a first one of said trunks for actuating at said first office the relay means associated with another one of said trunks and second means responsive to the seizure of said first trunk for actuating at said second office the relay means associated with still another one of said trunks.

9. The invention defined in claim 5 wherein each said trunk comprises relay means associated with each said office for blocking the seizure of said trunk by said associated office control means and wherein said circuit means comprises first means responsive to the concurrent seizure of a plurality of said trunks for actuating at said first office the relay means associated with a first one of said trunks other than said plurality and second means responsive to the seizure of a number of trunks less than said plurality for actuating at said second office the relay means associated with a second one of said trunks other than said plurality.

10. In a communication system, first and second switching offices, a plurality of two-way trunks interconnecting said offices, control means at each said office for extending calls in either direction over idle ones of said trunks and means for blocking attempts to simultaneously extend calls in both directions over the same trunks comprising circuit means for converting at least a pair of said two-way trunks into one-way trunks in opposite directions in response to each seizure of a predetermined number of trunks other than said pair.

11. The invention defined in claim 10 wherein said circuit means comprises means for converting one of said pair of trunks into a one-way trunk in accordance with a first predetermined number of said other trunks and means for converting the other trunk of said pair into a one-way trunk in accordance with a second predetermined number of said other trunks.

12. In a communication system at least two switching offices, a plurality of two-way trunks interconnecting said offices, means at each said office for selecting said trunks, and circuit means at one of said offices effective upon each seizure of a predetermined number of said trunks for making a first portion of said trunks available for selection at said one office and for making a second portion of said trunks available for selection at said other office.

13. In a communication system including communication paths extending between first and second offices, each end of each said path having a two-way trunk circuit associated therewith, means in each trunk circuit for indicating that the associated communication path is busy, and circuit means responsive to seizure of particular communication paths for operating the busy indicating means associated with other of said communication paths, said circuit means including means in the trunk circuits associated with one end of two of said particular communication paths for operating the busy indicating means of a trunk circuit associated with another communication path and means in the trunk circuit associated with the other end of said particular communication paths for operating the busy indicating means of a trunk circuit associated with a distinct other communication path.

* * * * *